(12) United States Patent
Hand et al.

(10) Patent No.: US 7,228,313 B1
(45) Date of Patent: Jun. 5, 2007

(54) TICKET TRACKING AND REFUNDING SYSTEM AND METHOD

(75) Inventors: Richard Hand, Katy, TX (US); Wendy Levitt, Guttenberg, NJ (US); David Pereira, Union, NJ (US); Anna Austin, Houston, TX (US); Gregory Coles, Houston, TX (US); Duane Jacobsen, Roseland, NJ (US); Vinny Khosla, Katy, TX (US); Thomas Lunsford, Houston, TX (US); Renee Richards, Glendale, AZ (US); Leigh Tomaski, Missouri City, TX (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 09/346,085

(22) Filed: Jul. 1, 1999

(51) Int. Cl.
*G06F 7/00* (2006.01)
*G06F 12/00* (2006.01)

(52) U.S. Cl. .................. 707/104.1; 705/5; 705/6

(58) Field of Classification Search .............. 705/5, 705/26, 37, 6; 380/23, 2 R; 707/3, 104.1
See application file for complete search history.

(56) References Cited

U.S. PATENT DOCUMENTS

| | | | |
|---|---|---|---|
| 5,404,291 A | 4/1995 | Kerr et al. | |
| 5,621,797 A | 4/1997 | Rosen | |
| 5,754,654 A * | 5/1998 | Hiroya et al. | 380/24 |
| 5,832,451 A * | 11/1998 | Flake et al. | 705/5 |
| 6,009,401 A | 12/1999 | Horstmann | |
| 6,085,169 A * | 7/2000 | Walker et al. | 705/26 |
| 6,086,477 A | 7/2000 | Walker et al. | |
| 6,094,640 A | 7/2000 | Goheen | |
| 6,101,477 A | 8/2000 | Hohle et al. | |
| 6,107,932 A * | 8/2000 | Walker et al. | 705/6 |
| 6,134,534 A * | 10/2000 | Walker et al. | 705/5 |
| 6,175,922 B1 | 1/2001 | Wang | |
| 6,241,606 B1 | 6/2001 | Riendeau et al. | |
| 6,307,572 B1 | 10/2001 | DeMarcken et al. | |
| 6,308,159 B1 | 10/2001 | Strohl | |
| 6,336,095 B1 | 1/2002 | Rosen | |
| 6,338,041 B1 | 1/2002 | Kawamata | |
| 6,442,526 B1 * | 8/2002 | Vance et al. | 705/5 |

(Continued)

FOREIGN PATENT DOCUMENTS

WO  WO/01/02980 A1  1/2001

OTHER PUBLICATIONS

Article entitled "A Smarter Way To Fly", published in ECompany Now, May 2000.*

(Continued)

*Primary Examiner*—Sam Rimell
(74) *Attorney, Agent, or Firm*—Snell & Wilmer, L.L.P.

(57) ABSTRACT

An automated method and system for refunding the unused portion of an electronic ticket are provided. In accordance with the method, an aging period is set and is added to the scheduled departure date of the issued ticket. If the schedules departure date plus the aging date is earlier than the current date, a determination is made as to whether the ticket has been used. If the ticket has not been used, the residual value of the ticket is calculated and a refund is issued.

23 Claims, 5 Drawing Sheets

U.S. PATENT DOCUMENTS

| | | |
|---|---|---|
| 6,599,186 B1 | 7/2003 | Walker et al. |
| 6,601,046 B1 | 7/2003 | Epstein |
| 6,658,390 B1 | 12/2003 | Walker et al. |
| 2001/0016825 A1 | 8/2001 | Pugliese, III et al. |
| 2002/0007327 A1 | 1/2002 | Steury et al. |
| 2002/0016723 A1 | 2/2002 | Matsui et al. |
| 2002/0019807 A1 | 2/2002 | Halpern |
| 2002/0023017 A1 | 2/2002 | Hidaka et al. |
| 2002/0026405 A1 | 2/2002 | Haar |
| 2002/0026416 A1 | 2/2002 | Provinse |
| 2002/0049658 A1 | 4/2002 | Davidson et al. |
| 2002/0069118 A1 | 6/2002 | Zylstra |
| 2002/0103849 A1 | 8/2002 | Smith |
| 2002/0138325 A1 | 9/2002 | Mashimo et al. |
| 2002/0139843 A1 | 10/2002 | Park et al. |
| 2002/0156715 A1 | 10/2002 | Wall et al. |
| 2003/0177022 A1 | 9/2003 | Francis |
| 2003/0216973 A1 | 11/2003 | Walker et al. |

OTHER PUBLICATIONS

Article entitled "Forgotten Tickets, Railroad Policy Survives", Published in New York Times, Dec. 19, 1997.*

Article entitled "Why do I have to Wait a Year to Get a REfund on My Airline Tickets?", published in Money Magazine, May 1997.*

Joseph Kornik; Firm's New System Tracks, Refunds Unused E-Tickets; Travel Weekly dated May 24, 1999; p. 24.

* cited by examiner

TICKET TRACKING AND REFUNDING SYSTEM AND METHOD

BACKGROUND OF THE INVENTION

This invention relates generally to a method and system for tracking tickets, and more specifically to a method and system for tracking unused electronic tickets and for providing refunds for those tickets.

The number of tickets being issued for airline and other forms of travel is rapidly increasing. It is especially true that the number of electronic tickets and specifically electronic tickets for airline travel is increasing very rapidly. Many travelers, and especially frequent business travelers, find themselves in the position of scheduling many trips, changing itineraries, canceling or rescheduling trips, and otherwise creating a complex history of travel scheduling and rescheduling. It is not unusual in the midst of this hectic travel history to lose track of or to forget unused tickets. The problem of forgetting about unused tickets is exacerbated by the growing use of electronic tickets, since, with the electronic ticket, the traveler may have no paper record to remain him or her that a ticket ever existed.

Unused and forgotten tickets expire after some prescribed period of time. If forgotten and unclaimed after expiration, the money paid for the ticket is usually kept by the airline. A frequent traveler or a business that employs one or more travelers can sustain a significant financial loss if a number of unused but paid for tickets expire and are not refunded.

In the past there has been no efficient way to track unused tickets and to provide a refund to the traveler or to the traveler's employer. Any systems that have been available have been substantially manual systems that are unreliable and have little ability to track past activity or to report on tickets actually refunded. Accordingly, a need existed for an automated system for identifying unused tickets that have not been refunded.

SUMMARY OF THE INVENTION

In accordance with one embodiment of the invention an unused electronic ticket refund management service and method are provided. The traveler's or the traveler's employer sets an aging period beyond which tickets are deemed to be unused. The aging period is added to the final scheduled departure date of the issued ticket and if the resultant data is earlier than the current date, a determination is made as to whether the ticket has been used or not. If the ticket is refundable and has not been used the residual value of the ticket is calculated and a refund is issued to the traveler or the purchaser of the ticket. The traveler is then notified and the database containing information about issued tickets is updated to reflect the fact that the electronic ticket has been closed.

DETAILED DESCRIPTION OF PREFERRED EMBODIMENTS

Figure 1:
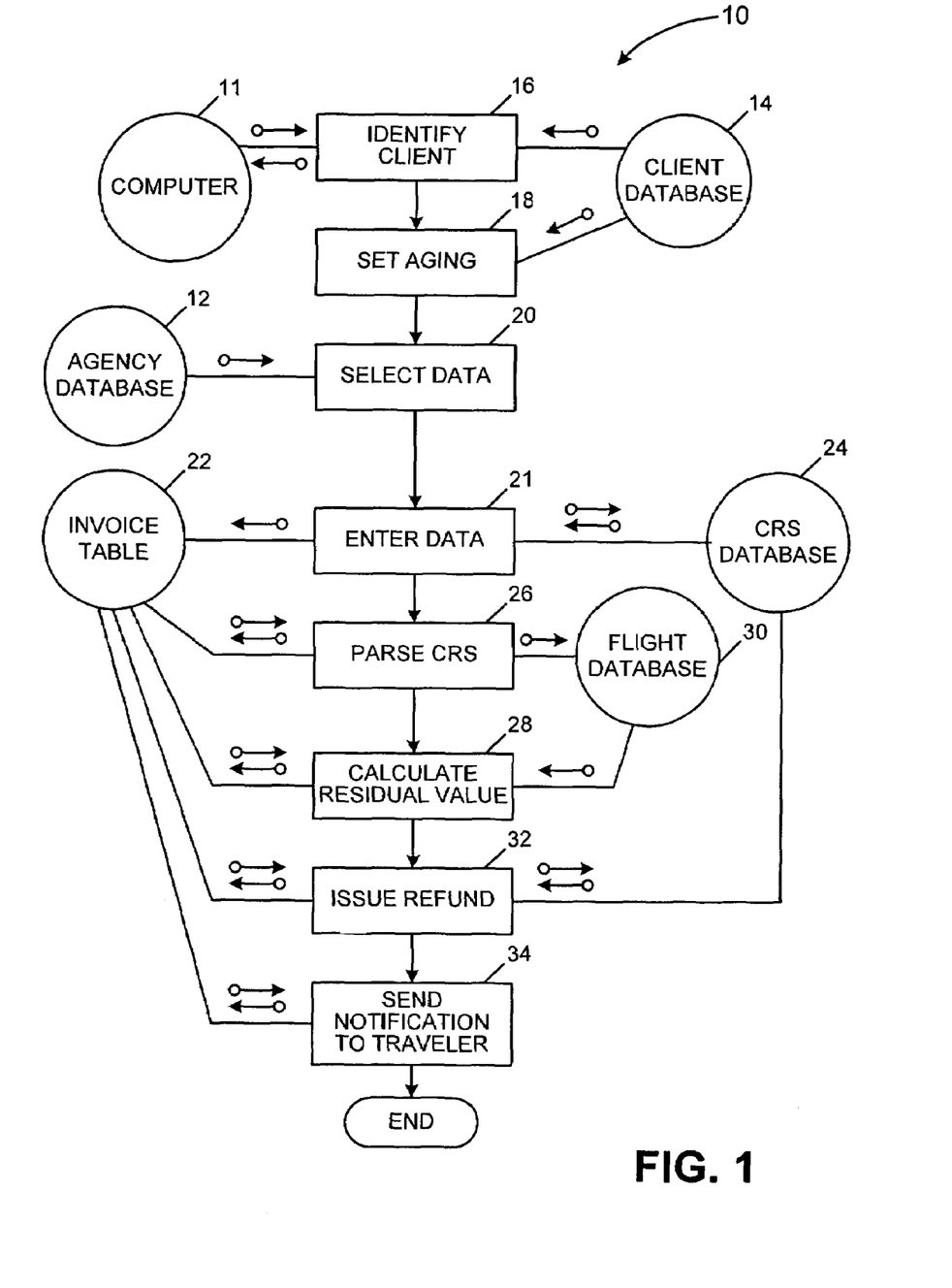
FIG. 1 is a flow chart illustrating a method and system in accordance with the invention for providing a refund for unused tickets.

FIG. 1 is a flow chart illustrating, at a high level, one embodiment of the ticket tracking and refunding system and method 10 in accordance with the invention. In describing the invention, reference will be made to a system and method for providing refunds for unused electronic airline tickets, but the invention is not limited to this illustrative embodiment. The refund system and method are applicable to other types of airline tickets, other types of travel, and to other ticketed endeavors. Further, the invention is illustrated with reference to services provided by a travel agency to a plurality of its clients. The clients can be individual travelers or businesses having employees that are frequent travelers. The invention, however, is not limited to such a travel agency or such a client.

In accordance with a preferred embodiment, the system includes a database 12 which includes all travel related activities scheduled and ticketed by the travel agency. In addition, a second database 14 includes a listing of all clients that subscribe to the refund management system. The two databases 12, 14 can, of course, be combined as a single database including all of the information contained in the two separate databases.

The refund process starts, at step 16, by identifying a client that has subscribed to the refund management system. The client is identified by accessing the data in database 14. The step of identifying a client is carried out by computer 11 using a standard software search routine. In this and other steps in accordance with the invention, a computer 11 is identified as the operative instrument for carrying out the step. In accordance with a preferred embodiment of the invention, all steps in the process are carried out on a centralized computer that has access to all of the relevant data bases. Alternatively, the functions carried out by computer 11 can be carried out by a plurality of local computers, preferably localized computers that are linked together. The client next determines an aging criteria at step 18. The aging criteria is a period of time ranging from zero days to three hundred and sixty five days. The aging criteria is set by the client and establishes a criteria for determining how old a ticket must be before it is assumed that ticket will not be used. Usually the aging criteria is set at between about fifteen days and about sixty days. The aging criteria set by a client can be stored in client database 14.

In step 20 all data from database 12 is selected that relates to the particular client and to tickets for which the final departure date on the ticket precedes the current date by a period of time greater than the aging period selected by the client. For example, if the client has selected an aging period of thirty days, all tickets issued to the client having a final scheduled departure date more than thirty days prior to the current date are selected. For convenience, such tickets will hereinafter be referred to as "aged tickets." An advantage of the process in accordance with the invention is that when a client subscribes to the refund process, the process can be applied to all ticket activity carried out by that client with the travel agency for some period of time prior to subscribing. For example, the process can be applied to all activity by that client during any of the previous time period for which the agency retains such records without manual support from the agency. Reference above is made to the "final" departure date because tickets may include several departure dates. For example, a ticket may include a departure date for each of the various segments of a trip.

At step 21 the information concerning the aged tickets is entered into an invoice table 22 which keeps all data on such aged tickets and, as will be explained later, on unused tickets. The refund system in accordance with the invention also uses data stored in one of the central reservation system (CRS) databases 24. There are several central reservation system databases available. These databases are maintained by the airline industry and are accessible by any travel agent. Database 24 includes information on all issued tickets. Whenever a ticket is issued for any flight, that information is stored in the central reservation system database. It is important that much of this same information is also stored in agency database 12 because the airline delete records, usually within seven days, following the date the ticket is used, or when the ticket passes an expiration date. For most airlines the expiration date is thirteen months after the ticket date; for some airlines it is twenty four months after the ticket date. The process described herein can be applied to any tickets that have not passed the expiration date as long as the relevant information is stored in the agency database 12. That is, the process in accordance with the invention can be applied to any ticket issued in the last thirteen months (or twenty four months with some airlines). Without having the relevant information in the agency database, if no record for a particular ticket was found in the CRS database, it would not be possible to determine whether the ticket had been used or whether it had passed its expiration date.

The refund process continues with step 26 in which the central reservation system database 24 is parsed. Step 26 will be explained in more detail below, but, in summary, step 26 includes using the information from the central reservation system and from the invoice table to determine whether a particular ticket has been used or not, and if the ticket is an unused, aged ticket, to determine whether the ticket is refundable or not, and to determine the residual value of that ticket.

The refund process continues with step 28 in which the residual value of an unused and aged ticket is calculated. Step 28 will be explained in more detail below, but, in summary, includes using the information parsed from the central reservation system database, the invoice table 22, and additionally information stored in yet another database, flight database 30. Fight database 30 holds information on particular flights, including the flight number, cost of the ticket, departure city and arrival city, departure date, and any information on whether and to what extent the ticket is refundable. If refundable, the refund amount is calculated as being the residual value of the ticket less any fees assessed to the ticket holder such as fees for changing an itinerary or for refunding the ticket.

The next step in the process, in accordance with the invention, step 32, is to issue a refund to the client. Again, this step will be explained in more detail below. In summary, the step of issuing a refund, besides issuing a check or credit to the client, includes updating the central reservation system database 24 and the invoice table.

In accordance with one embodiment of the invention, the refund process 10 concludes with the step of sending notification of the refund to the traveler, step 34.

Figure 2:
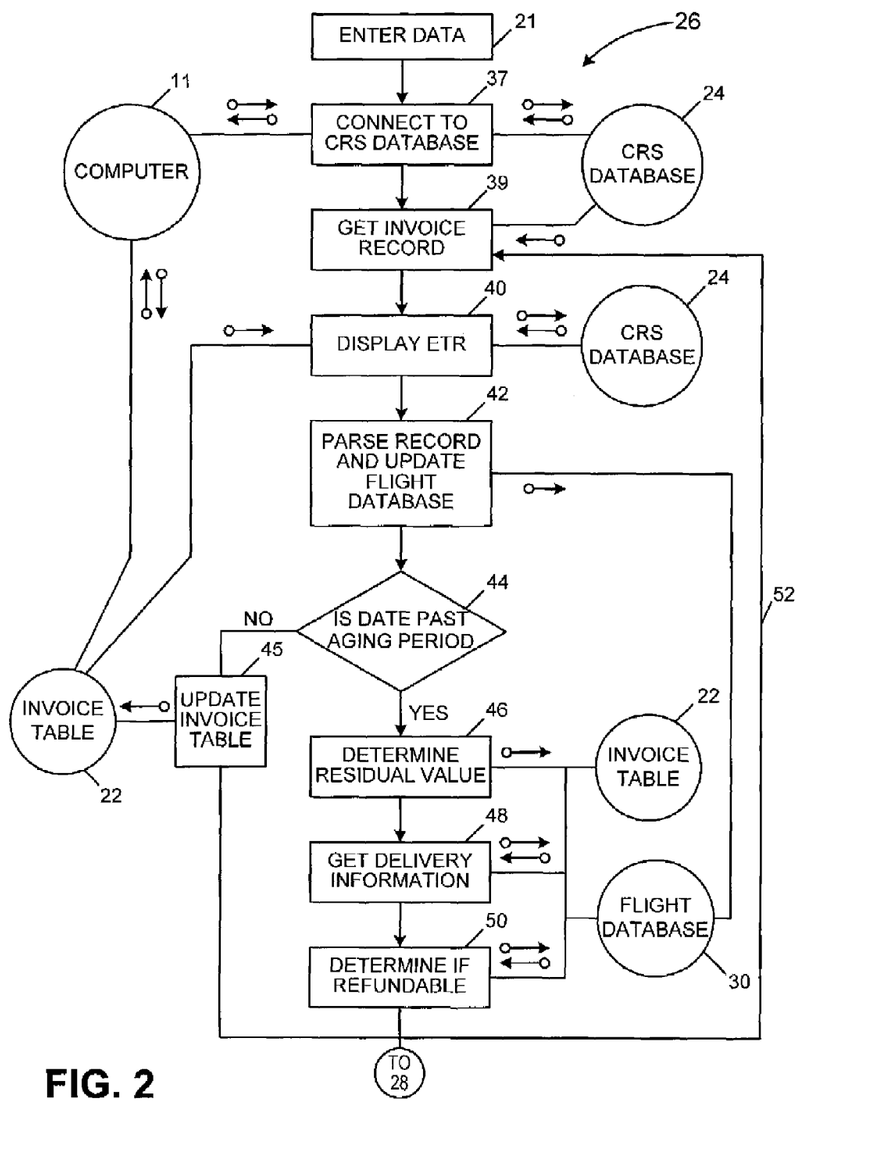
FIGS. 2-5 are flow charts illustrating, in more detail, particular embodiments of the process illustrated in FIG. 1.

FIGS. 2-5 illustrate, in flow chart form, aspects of various embodiments of the invention in greater detail. FIG. 2 illustrates in more detail, for example, step 26 of parsing the central reservation database. As explained above, the refund method in accordance with the invention is practiced by implementing various process steps on a computer 11. Computer 11 is preferably a centralized computer controlling and/or interfacing with each of the various databases, but alternatively can be a plurality of individual personal computers or the like. Throughout the illustrative figures, computer 11 will be illustrated as a single centralized computer. As such, computer 11 performs the various method steps by appropriately interfacing with the databases that comprise the total system.

Step 26 of the refund method starts by connecting computer 11 to the central reservation system database 24, step 37. Similarly, computer 11 connects to invoice table 22 and retrieves information from the table, step 39, concerning a particular passenger and a particular invoice for a ticket judged to be an aged ticket. The invoice may include multiple flights or multiple flight segments for that particular passenger. Information is also retrieved from central reservation system database 24 concerning each of those flights and flight segments to determine which portion of the invoice has been used.

In step 40 the electronic ticket record (ETR) is viewed and a determination is made by software resident in computer 11 as to what ticket segments were used, what fare was paid for those ticket segments, and whether the ticket is refundable or not. The information necessary for carrying out step 40 is found in the central reservation system data base 24.

In step 24 the information retrieved in step 40 is parsed and flight database 30 is updated to reflect the information retrieved from the central reservation system database. As part of step 42 a determination is made as to the last open segment of any of the scheduled flights that were ticketed. This reflects the fact that a portion of the ticket may have been used while other segments were not used. In addition, the traveler may have revised the ticket to change the scheduled time. That information would be found in the central reservation system database, but might not be reflected in the invoice table or flight database. Flight database 30 is updated with the revised open segment information.

In step 44 the updated information on the date of the last open segment is compared to the current date to determine whether that date has exceeded the aging period. If not, for example because the traveler has revised the schedule department departure dates, the invoice table is updated with the revised last scheduled open segment date, step 45, and the process is terminated with respect to that particular traveler or invoice. Upon such termination, the process returns to step 39 and retrieves another invoice record. If the last open segment departure date is past the aging period, the residual value of the ticket or ticket segment is determined at step 46. This information is used to update both the flight database and the invoice table. In accordance with one embodiment of the invention, the next step in the process, step 48, is to retrieve delivery information. This information, includes, for example, the address and/or fax number for the scheduled traveler. This information is retrieved from the ticketing database 12 (not illustrated in this figure), invoice table 22, or flight database 30. In step 50 a determination is made as to whether the ticket or ticket segment is refundable. This determination is a compilation of information stored in the flight database concerning the original nature of the ticket plus information from the central reservation system database concerning whether the ticket was used or not. The information so determined is used to update both the flight database 30 and the invoice table 22. Following the updating of invoice table 22, either after step 50 or after step 45, the process continues with the step of calculating the residual value, step 28. Optionally, the process also continues by path 52, by returning to step 39 and repeating the process for an additional invoice record for the same client.

Figure 3:
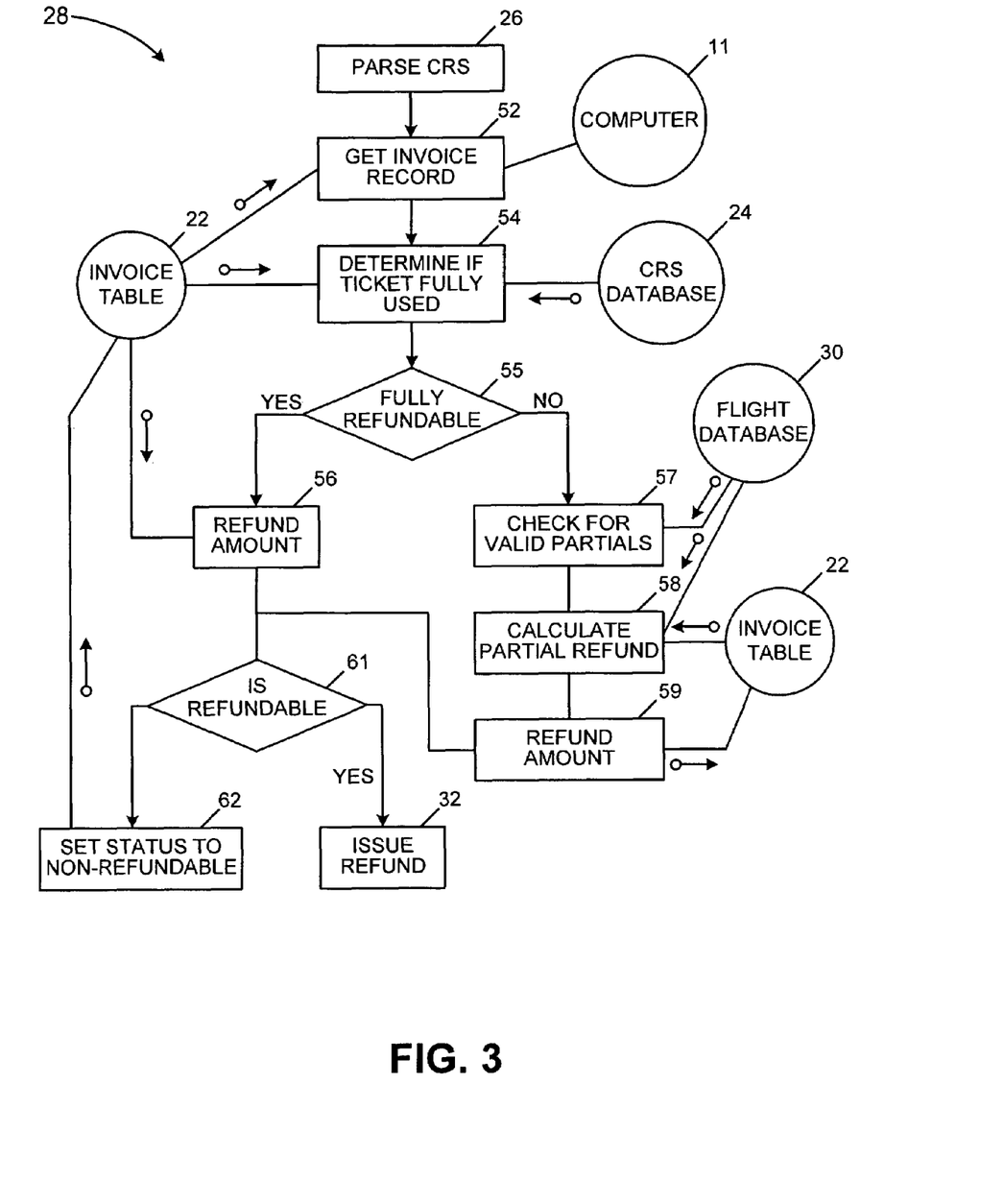

FIG. 3 illustrates, in more detail, aspects of various embodiments of method step 28, calculating the residual value. The step of calculating the residual value starts by retrieving information from the invoice table 22, step 52. Again, the method steps illustrated in FIG. 3 are carried out by computer 11 which can be either a centralized computer or a plurality of distributed computers. Based on the information in the invoice table and in the central reservation system database 24, a determination is made at step 54 of whether the ticket or ticket segment has been fully used. Based on the determination of whether the ticket has been fully used or not, a further determination is made at step 55 as to whether the ticket is fully refundable or not. Depending on the contract terms entered into when the ticket was issued, some tickets may not be refundable if any portion of the ticket has been used. Further contract terms may apply if part of the ticket has been used. If the ticket is fully refundable, the refund amount is determined to be, in accordance with step 56, the residual value calculated in step 46. If the ticket or ticket segment is not fully refundable, a determination is first made at step 57 as to whether the remaining portion of the ticket is a valid partial. That is, a determination is made as to whether the partial ticket is refundable if some other portion of the ticket has been used. This determination is made based on information stored in the flight database 30. If the remaining portion is determined to be a valid portion, the partial refund amount is calculated in step 58. The amount calculated in step 58 is dependent on information retrieved from the flight database 30 and invoice table 22. Flight database 30 includes information concerning fees and penalties that may be assessed in the event a ticket is changed, canceled, partially used, or not used at all. This information is used in calculating the partial refund amount. The refund amount, step 59, is determined to be the amount so calculated. The amount determined in steps 58 and 59 is used to update invoice table 22. After determining the refund amount in either step 56 or step 59, a final determination is made at step 61 as to whether there are any additional penalties, fees or other considerations to affect the refund amount. If the ticket is determined to be non-refundable, at step 61 the status of the ticket is set to non-refundable in the invoice table and the process is terminated with respect to this record. If the ticket is determined at step 61 to be refundable, the process continues to step 32 and the refund is issued.

Figure 4:
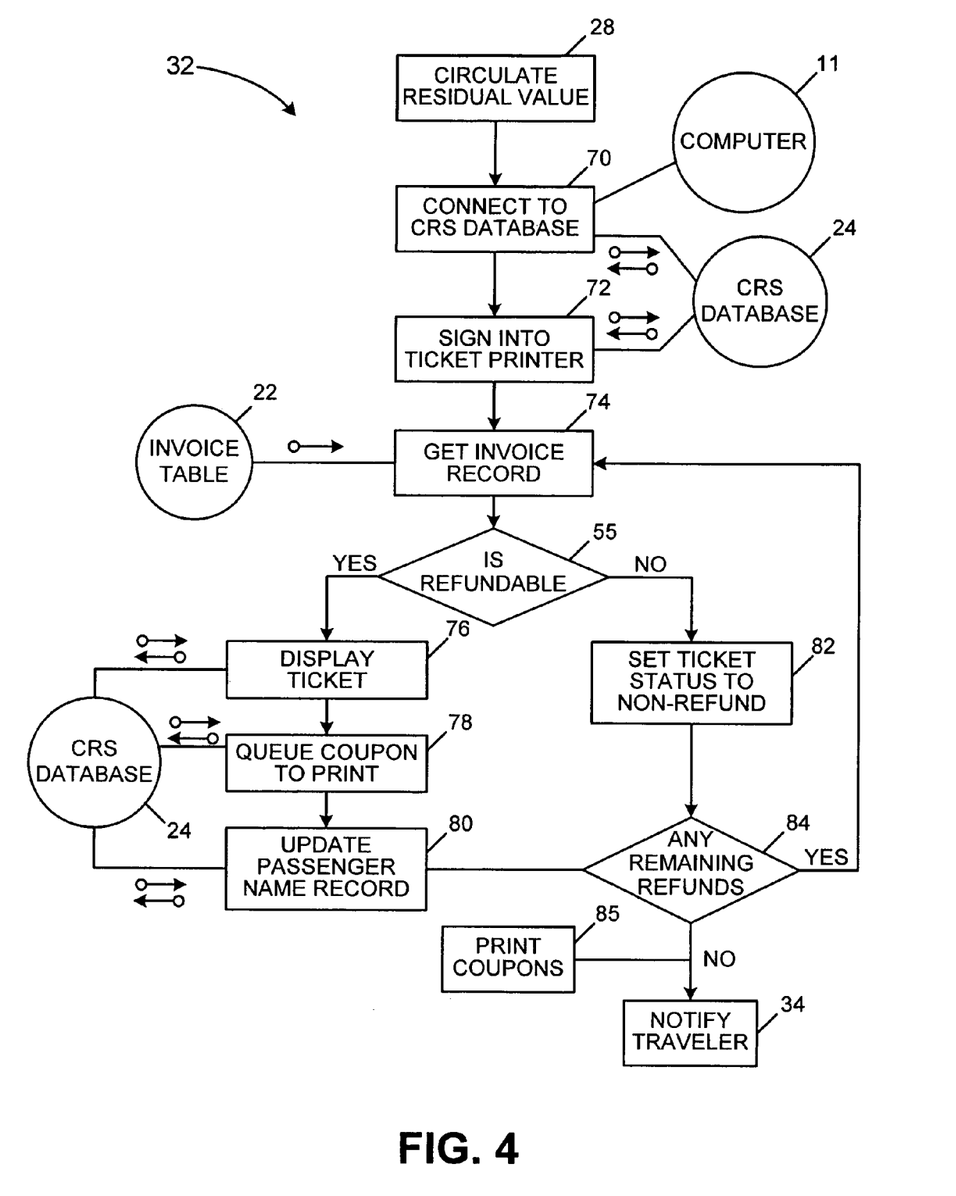

FIG. 4 illustrates, in accordance with various embodiments of the invention, issue refund step 32 in more detail. Following the completion of step 28, computer 11 again connects to the central reservation system database in step 70. The step of issuing a refund is closely connected to central reservation system database 24 because, in general, the process of issuing a refund requires an involved process in which the electronic ticket is returned to the airline. As part of a checks and balances system, a coupon is printed indicating the return of the ticket; at a later time the returned-ticket coupon can be matched up with the airline records of the ticket for which a refund was granted. In accordance with an embodiment of the invention, computer 11 signs into a ticket printer in step 72. Again, this is done interactively with the central reservation system database. Computer 11 then retrieves the record of the transaction from the invoice table at step 74. If the ticket in question is refundable and has not been used, that information is conveyed to database 24 at step 76. A coupon is then queued to print at step 78. Printing occurs at the end of the process for a particular traveler, as described below. Following the queuing of the coupon, the passenger name record for the particular ticketed passenger is updated, step 80, in database 24. Again, steps 76, 78, and 80 are all interactive with a central reservation database. If computer 11 determines from the invoice table that the ticket in question is not refundable, the ticket status for this transaction is set to show that the ticket is non-refundable in step 82. The invoice table is updated to reflect this status. In step 84 computer 11 determines, at the completion of either step 80 or step 82 whether any refunds are remaining for this passenger name record. If there are additional refund issues remaining for this passenger name record, the process returns to step 74 and the next invoice record for this client is processed. If there are no further refunds to be processed for this passenger name record, the coupons in the queue are printed, step 85, and the process continues, in accordance with one embodiment, with step 34.

Figure 5:
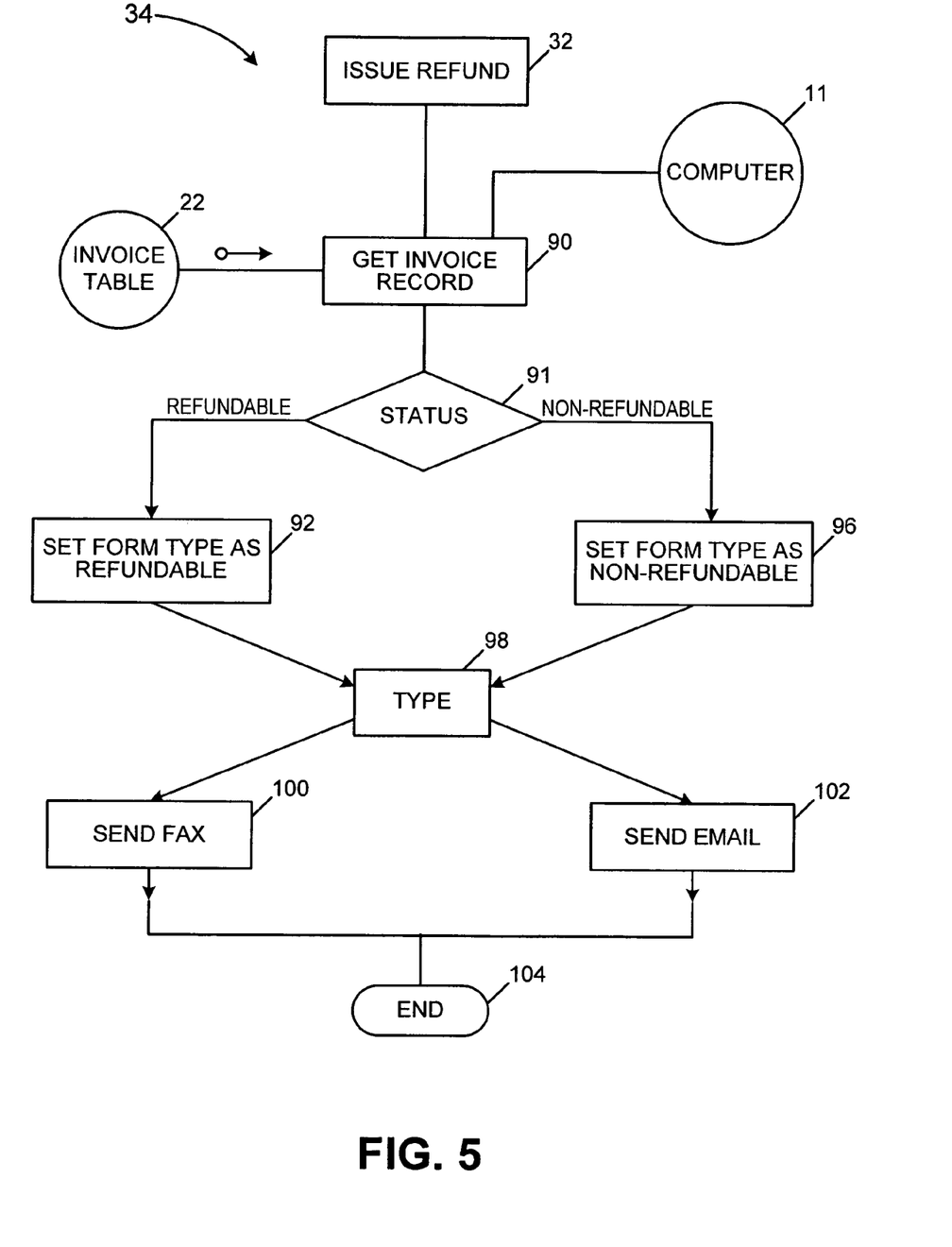

In accordance with one embodiment of the invention, as illustrated in FIG. 5, following the step of issuing a refund, step 32, notification is sent to the passenger in step 34. Computer 11 again interfaces with invoice table 22 to retrieve the record of this transaction and to get the delivery information generated in step 48. This is done in step 90. Based on the record retrieved in step 90, computer 11 makes a determination, in step 91, as to the status of this transaction, either refundable or non-refundable. If the status is determined to be refundable, a form is selected in step 92 for a refundable transaction. If the transaction is determined to be non-refundable, a form is selected in step 96 for a non-refundable transaction. The form selected in either step 92 or 96 is typed in step 98 and then is sent by facsimile in step 100 to the ticketed traveler or sent by e-mail to the ticketed traveler in step 102. Upon notification of the traveler, the process is completed, at step 104, for this traveler. The process can now be repeated for other travelers or for other clients.

This it is apparent that there has been provided, in accordance with the invention, a refund system and method that fully meet the needs specified above. Although the system and method have been described and illustrated with reference to specific illustrative embodiments, it is not intended that the invention be limited to these illustrative embodiments. Those skilled in the art will recognize that many variations and modifications to these illustrative embodiments are possible without departing from the spirit and scope of the appended claims. For example, as noted above, the databases that have been referred to can be individual databases, a single central database, or databases partitioned in ways other than as illustrated in the figures. Preferably the invention is practiced through use of a single central computer which can contain all transactions for a particular client, regardless of location of that client or various departments, divisions or other segments of that client. Additionally, the invention has been illustrated with reference to particular practices presently in use by the airline industry. Those of skill in the art will recognize that the airline industry periodically changes its practices, procedures, and requirements, and the invention is not to be limited to any one particular set of airline requirements. Further, although illustrated with reference to electronic tickets used in the airline industry, the invention is applicable to other forms of ticketing in the airline industry, in other modes of transportation, and other ticketed activities.

The invention claimed is:

1. A computer-implemented method for facilitating the automated refund or an unused ticket comprising the steps of:

setting an aging period, via a first party computer system, wherein the aging period establishes a criteria for determining how old a ticket must be before it is assumed that the ticket will not be used;

identifying, via the first party computer system, the scheduled departure date of an issued ticket for selected purchasers;

adding, via the first party computer system, the aging period to the scheduled departure date and if the scheduled date plus the aging period is earlier than the current date, determining, via the first party computer system, whether at least one segment of the ticket has not been used, wherein the segment is one leg of a multi-leg trip;

when at least one segment of the ticket has not been used, calculating, via the first party computer system, the residual value of the ticket by analyzing the residual value of each segment using segment information, wherein analyzing the residual value includes analyzing fare basis codes, used ticket segments, unused ticket segments, fare paid for ticket segments, penalty information and if the ticket is refundable; and, issuing, via the first party computer system, a refund from a third party carrier, wherein the ticket previously provided access to travel on the carrier.

2. The method of claim 1, wherein the step of setting an aging period comprises selecting a period of between 0 and 365 days.

3. The method of claim 1, wherein the step of setting, an aging period comprises selecting a period of between about fifteen days and sixty days.

4. The method of claim 1, wherein the step of identifying the scheduled departure date comprises identifying a date between the current date and a date thirteen months prior to the current date.

5. The method of claim 1, wherein the step of determining whether at least one segment of the ticket has not been used comprises parsing the appropriate airline reservation data from a third party central reservation system.

6. The method of claim 5, wherein parsing the appropriate airline reservation includes:
connecting the first computer system to the third party central reservation system;
connecting the first computer system to an invoice table;
retrieving data from the invoice table, wherein the data includes at least one of passenger data, flight data, flight segment data and invoice data related to an aged ticket;
determining additional data, wherein the additional data includes at least one of used flight segments, fares paid for the used flight segments, ticket revisions, last open segment and if the ticket is refundable; and,
updating the first computer system with the data and the additional data.

7. The method of claim 1, further comprising updating, via the first party computer system, a third party central reservation system to indicate at least one of a refund has been issued and the ticket has been cancelled.

8. The method of claim 1, further comprising establishing, the first party computer system, a ticket database-including tickets that have not passed on expiration date.

9. The method of claim 1, further comprising updating, via the first party computer system, a third party central reservation system database to indicate a refund has been refunded.

10. The method of claim 1, further comprising determining, the first party computer system using data from a third party central reservation system, the extent to which each of the tickets is refundable.

11. The method of claim 1, further comprising the updating the scheduled departure date to include any changes made to the ticket.

12. The method of claim 11 further comprising updating, via the first party computer system using data from a third party central reservation system, a ticket database to include any changes made to the ticket.

13. The method of claim 1, wherein the step of issuing, via the first party computer system, a refund comprises calculating, via the first party computer system, a refund amount based on the residual value minus any fees due.

14. The method of claim 1, further comprising notifying, via the first party computer system, a passenger for whom the ticket was issued.

15. The method of claim 1, further comprising determining via the first party computer system, whether a purchaser is due any further refunds.

16. The method of claim 1, further comprising determining, the first party computer system, when the selected ticket has been partially used by determining when at least one segment has been used.

17. The method of claim 1, further comprising updating, via the first party computer system, a database to indicate a refund has been issued.

18. The method of claim 1, further including obtaining revised departure dates and terminating the method for at least one of a particular traveler and invoice.

19. The method of claim 1, further including determining if the ticket is refundable.

20. The method of claim 1, wherein calculating the residual value includes:
retrieving data from at least one of a flight database, an invoice table and the third party central reservation system;
determining, based on the data, if the at least one segment of the ticket has not been used;
determining, based on the data, if the ticket is refundable; and,
determining, based on the data, if any fees or penalties were assessed against the ticket.

21. The method of claim 1 further including a second party providing information to facilitate setting an aging period.

22. The method of claim 1 further including notifying a second party of the refund.

23. The method of claim 1, wherein at least one of the identifying, determining and calculating steps use date from a third party central reservation system.

* * * * *

UNITED STATES PATENT AND TRADEMARK OFFICE
CERTIFICATE OF CORRECTION

| | | |
|---|---|---|
| PATENT NO. | : 7,228,313 B1 | Page 1 of 1 |
| APPLICATION NO. | : 09/346085 | |
| DATED | : June 5, 2007 | |
| INVENTOR(S) | : Richard Hand et al. | |

It is certified that error appears in the above-identified patent and that said Letters Patent is hereby corrected as shown below:

On the Title Page, Item -56- the following references should be listed under References Cited.
U.S. Patent Documents
4,720,785   1/1988    Shapiro
5,023,782   6/1991    Lutz et al.
5,237,499   8/1993    Garback
5,467,269   11/1995   Flaten
5,483,444   1/1996    Heintzeman et al.
5,513,102   4/1996    Auriemma
5,724,520   3/1998    Goheen
5,781,892   7/1998    Hunt et al.
5,797,127   8/1998    Walker et al.
5,878,139   3/1999    Rosen On the Title Page, Item -56- should read,
Foreign Patent Documents
WO 96/07266   3/1996    PCT On Column 8, line 58, please delete "date" and insert therefor --data--.

Signed and Sealed this

Twenty-fourth Day of July, 2007

JON W. DUDAS
*Director of the United States Patent and Trademark Office*